US011226133B2

(12) United States Patent
Miura

(10) Patent No.: US 11,226,133 B2
(45) Date of Patent: Jan. 18, 2022

(54) WATER HEATING APPARATUS

(71) Applicant: NORITZ CORPORATION, Hyogo (JP)

(72) Inventor: Keiichi Miura, Hyogo (JP)

(73) Assignee: NORITZ CORPORATION, Hyogo (JP)

( * ) Notice: Subject to any disclaimer, the term of this patent is extended or adjusted under 35 U.S.C. 154(b) by 117 days.

(21) Appl. No.: 16/613,793

(22) PCT Filed: May 9, 2018

(86) PCT No.: PCT/JP2018/017897
§ 371 (c)(1),
(2) Date: Nov. 14, 2019

(87) PCT Pub. No.: WO2018/216467
PCT Pub. Date: Nov. 29, 2018

(65) Prior Publication Data
US 2020/0072497 A1     Mar. 5, 2020

(30) Foreign Application Priority Data
May 22, 2017    (JP) .............................. JP2017-100699

(51) Int. Cl.
*F24H 1/10*      (2006.01)
*F23D 14/02*      (2006.01)
(Continued)

(52) U.S. Cl.
CPC ........... *F24H 1/107* (2013.01); *B23K 1/0012* (2013.01); *F23D 14/02* (2013.01); *F24H 1/0036* (2013.01);
(Continued)

(58) Field of Classification Search
CPC .......... F24H 1/107; F24H 9/1809; F24H 1/43; F24H 1/0036; F23D 14/02;
(Continued)

(56) References Cited
U.S. PATENT DOCUMENTS
3,874,592 A * 4/1975 Buschmann ............ F23D 11/36
239/132.3
4,101,265 A * 7/1978 Broach ................ F23L 15/045
432/29
(Continued)

FOREIGN PATENT DOCUMENTS
JP    S58193039    11/1983
JP    H07167582    7/1995
JP    2016503484    2/2016

OTHER PUBLICATIONS
"International Search Report (Form PCT/ISA/210) of PCT/JP2018/017897," dated Aug. 14, 2018, with English translation thereof, pp. 1-3.

*Primary Examiner* — Edelmira Bosques
*Assistant Examiner* — Andrew W Cheung
(74) *Attorney, Agent, or Firm* — JCIPRNET

(57) ABSTRACT

[Problem] To provide a water heating apparatus which has a inverse combustion type burner installed within a case for a heat exchanger so as to cause heat to be transferred from an outer peripheral flange of the burner to the heat exchanger case. [Solution] This water heating apparatus is provided with: a fan for supplying combustion air; a chamber case which is connected to the fan and which has set therein a chamber where an air-fuel mixture is formed; a inverse combustion type burner for combusting the air-fuel mixture supplied from the chamber; a heat exchanger in which combustion gas generated by the burner is introduced into a case where water is heated; and sealing member which is installed between a peripheral flange of the chamber case
(Continued)

and a peripheral flange of the case, wherein the burner is set inside the case, and an outer peripheral flange of the burner is anchored to an inner wall surface of the case.

2 Claims, 8 Drawing Sheets

(51) Int. Cl.
  *F24H 1/00* (2006.01)
  *F24H 9/18* (2006.01)
  *B23K 1/00* (2006.01)
(52) U.S. Cl.
  CPC ..... *F24H 9/1809* (2013.01); *F23D 2203/102* (2013.01); *F23D 2214/00* (2013.01); *Y02B 30/00* (2013.01)
(58) Field of Classification Search
  CPC ............. F23D 2203/102; F23D 14/145; F23D 2214/00; B23K 1/0012; F28D 7/0041; F22D 1/16; Y02B 30/00
  USPC ........ 122/106, 107, 158, 108, 18.3; 165/169
  See application file for complete search history.

(56) References Cited

U.S. PATENT DOCUMENTS

| | | | | |
|---|---|---|---|---|
| 4,206,805 A * | 6/1980 | Beckett | ............... | F04B 39/06 165/169 |
| 4,556,104 A * | 12/1985 | Engelhardt | ............... | F23M 5/08 165/145 |
| 4,737,102 A * | 4/1988 | Jinno | ............... | F23C 5/02 122/18.4 |
| 5,355,841 A * | 10/1994 | Moore, Jr | ............... | F23D 14/145 122/18.31 |
| 5,494,003 A * | 2/1996 | Bartz | ............... | F24H 1/205 122/18.31 |
| 5,520,536 A * | 5/1996 | Rodgers | ............... | F23D 14/02 126/116 R |
| 6,129,545 A * | 10/2000 | Kahlke | ............... | F23D 14/02 431/328 |
| 6,662,758 B1 * | 12/2003 | Shin | ............... | F24H 8/00 122/18.1 |
| 8,286,594 B2 * | 10/2012 | Smelcer | ............... | F23D 23/00 122/13.3 |
| 2010/0116226 A1 * | 5/2010 | Lovascio | ............... | F24H 9/1836 122/367.1 |
| 2012/0285399 A1 * | 11/2012 | Tyler | ............... | F22D 1/16 122/444 |
| 2014/0014047 A1 * | 1/2014 | Garcia | ............... | F23D 14/045 122/18.4 |
| 2014/0033994 A1 * | 2/2014 | Ding | ............... | F24H 8/00 122/18.3 |
| 2015/0153067 A1 * | 6/2015 | Le Mer | ............... | F23D 14/70 122/18.4 |
| 2015/0241130 A1 * | 8/2015 | Kim | ............... | F24H 8/00 165/140 |
| 2017/0350617 A1 * | 12/2017 | Ojiro | ............... | F24H 1/403 |

\* cited by examiner

WATER HEATING APPARATUS

CROSS-REFERENCE TO RELATED APPLICATION

This application is a 371 application of the International PCT application serial no. PCT/JP2018/017897, filed on May 9, 2018, which claims the priority benefits of Japan Patent Application No. 2017-100699, filed on May 22, 2017. The entirety of each of the above-mentioned patent applications is hereby incorporated by reference herein and made a part of this specification.

BACKGROUND

Technical Field

The disclosure relates to a inverse combustion type water heating apparatus and relates to an apparatus in which an amount of heat transferred from a burner to a chamber case and a mixed gas sealing member is greatly reduced by setting the burner in a case of a heat exchanger and radiating heat from the burner to the case.

Description of Related Art

As shown in FIGS. 12 and 13, a conventional all primary type inverse combustion type water heating apparatus 100 includes a fan (not shown) which supplies combustion air, a chamber case 101 connected to the fan to form an air-fuel mixture in a chamber 101a inside the chamber case 101, a mixed gas sealing member 102 mounted in a sealing member groove 101c of a flange part 101b of the chamber case 101, a inverse combustion type burner 103 which burns the air-fuel mixture supplied from the chamber 101a, a heat exchanger 105 to which a combustion gas generated in the burner 103 is supplied to heat water, and an exhaust gas sealing member 104 mounted between a flange part 103a of the burner 103 and a flange part 105b of a case 105a of the heat exchanger 105. A plurality of heat radiation fins 101d is formed on a top portion of the chamber case 101.

In a combustion apparatus described in Patent Document 1, a structure in which a flange part of a combustion plate (a burner) is sandwiched between a flange part of a burner body (a chamber case) and a flange part of a combustion case (a case of a heat exchanger) and fastened with bolts is adopted.

In a gas boiler described in Patent Document 2, a structure in which a flange part of a burner is clamped together with a sealing member and then fastened with a bolt between a flange part of a chamber case of a gas supply chamber and a flange part of a case of a heat exchanger is adopted.

RELATED ART

Patent Document

[Patent Document 1] Japanese Laid-open No. 2016-223710
[Patent Document 2] Published Japanese Translation No. 2016-503484

SUMMARY

Problems to be Solved

In the inverse combustion type water heating apparatus 100 shown in FIGS. 12 and 13, the mixed gas sealing member 102 and a sealing member pressing plate are sandwiched between the flange part 101b of the chamber case 101 in which the air-fuel mixture is formed in the chamber 101a inside the chamber case 101 and the flange part 103a of the burner 103, the exhaust gas sealing member 104 is sandwiched between the flange part 103a of the burner 103 and the flange part 105b of the case 105a of the heat exchanger 105, and the members are fastened by a plurality of screws.

Thus, the flange part of the burner is excessively heated by heat transfer from the burner, and it is necessary to use an expensive product formed of a material having a high heat resistance grade as the mixed gas sealing member. Additionally, since the heat transferred to the flange part of the burner is released into the atmosphere from the chamber case and the plurality of heat radiation fins formed on the outer surface side of the chamber case, the heat cannot be used effectively for heating water.

Also in the apparatuses of Patent Document 1 and 2, since the structure in which the flange part of the burner is sandwiched and fixed between the flange part of the chamber case and the flange part of the case of the heat exchanger together with the air-fuel mixture sealing member is adopted, as described above, a large amount of heat is transferred from the burner to the flange part, and there is a problem similar to the above.

The disclosure provides a water heating apparatus in which a inverse combustion type burner is set in a case of a heat exchanger and heat is transferred from a peripheral flange of the burner to the case of the heat exchanger.

Means for Solving the Problems

A water heating apparatus of a first aspect includes a fan which supplies combustion air, a chamber case which is connected to the fan and in which an air-fuel mixture is formed in a chamber inside the chamber case, a inverse combustion type burner which burns the air-fuel mixture supplied from the chamber, a heat exchanger which has a case and in which combustion gas generated in the burner is supplied into the case to heat water, and a sealing member which is mounted between a first peripheral flange of the chamber case and a second peripheral flange of the case, wherein the burner is set inside the case, and an outer peripheral flange provided on the burner is fixed to an inner wall surface of the case.

With such a configuration, since the burner is set in the case of the heat exchanger and the outer peripheral flange of the burner is fixed to the inner wall surface of the case, the heat transferred to the outer peripheral flange of the burner is transferred from the case of the heat exchanger to water through the heat transfer tubes, the cooling pipes or the fins and can be effectively used for heating the water.

Further, since the outer peripheral flange of the burner is not excessively heated, an air-fuel mixture sealing member can be manufactured at low cost with a material having a reduced heat resistance grade.

According to the water heating apparatus of a second aspect, in the disclosure of the first aspect, a holding flange capable of holding the outer peripheral flange of the burner from a side below may be provided on the inner wall surface of the case of the heat exchanger, and the outer peripheral flange of the burner may be fixed to the inner wall surface of the case or the holding flange by brazing.

With such a configuration, since the outer peripheral flange of the burner is fixed to the inner wall surface of the case or the holding flange by brazing, the outer peripheral flange of the burner can be supported by the inner wall surface of the case with a simple structure.

According to the water heating apparatus of a third aspect, in the disclosure of the first or second aspect, the heat exchanger may include a plurality of heat transfer tubes provided to cross an inside of the case, a plurality of heat transfer fins through which the plurality of heat transfer tubes are inserted, and a plurality of cooling pipes which cool the case, and at least some of the plurality of cooling pipes may be set at positions closer to the chamber than that of the burner is.

According to the above-described configuration, even when the heat transferred from the outer peripheral flange of the burner to the case of the heat exchanger is transferred upward from the case, because at least a part of the cooling pipe is set at a position closer to the chamber than that of the burner is, the transferred heat is reliably absorbed by the water in the cooling pipe.

Effects

According to the disclosure, various effects as described above can be obtained.

DESCRIPTION OF THE EMBODIMENTS

Figure 1:
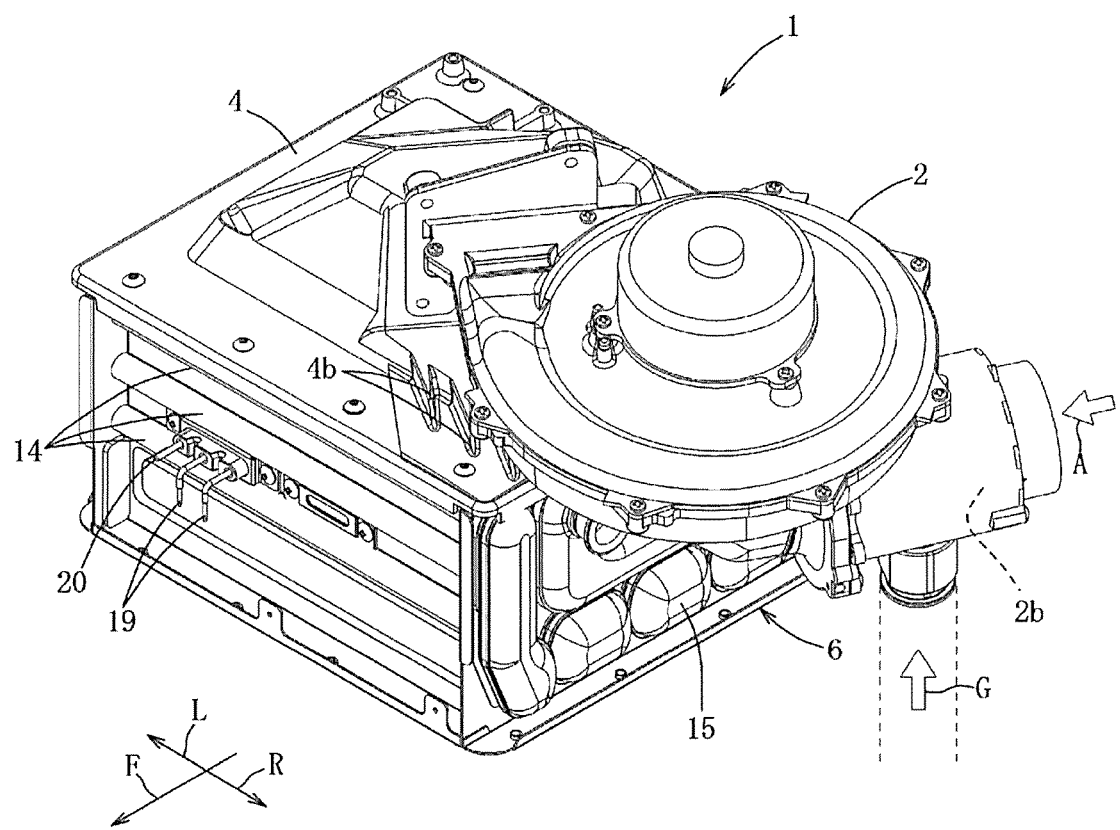
FIG. 1 is a perspective view of a water heating apparatus according to an embodiment of the disclosure.

Hereinafter, embodiments for carrying out the disclosure will be described with reference to the drawings.

As shown in FIGS. 1 to 7, an all primary type inverse combustion type water heating apparatus 1 includes a fan 2 which supplies combustion air, a chamber case 4 in which a chamber 3 is formed, a inverse combustion type burner 5 set below the chamber case 4, a sensible heat recovering heat exchanger 6 set below the chamber case 4, and an air-fuel mixture sealing member 7, and the like. Further, F, L, and R in FIG. 1 will be described as the front side, the left side, and the right side.

The fan 2 is configured with, for example, a turbo fan and set on the side above the chamber case 4, and a blowout port 2a of the fan 2 is connected to a fan connection port 4a of the chamber case 4. The chamber case 4 is formed of an aluminum alloy and has a chamber 3 in which an air-fuel mixture is formed and the fan connection port 4a at a top portion thereof. A venturi 2b which supplies a fuel gas is provided in the fan 2, and the air-fuel mixture composed of combustion air A and a fuel gas G is formed in the chamber 3.

Figure 8:
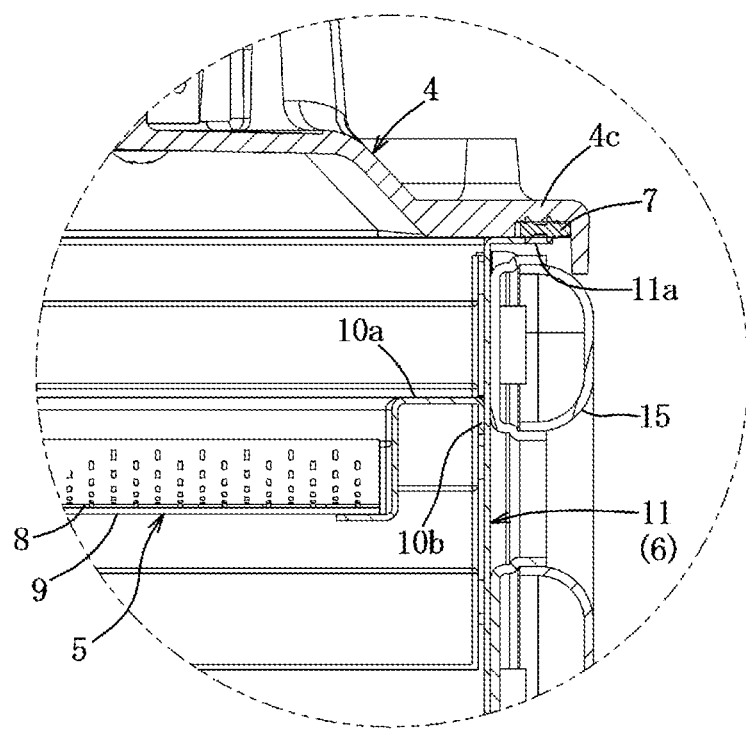
FIG. 8 is an enlarged view of a part a of FIG. 5.
Figure 9:
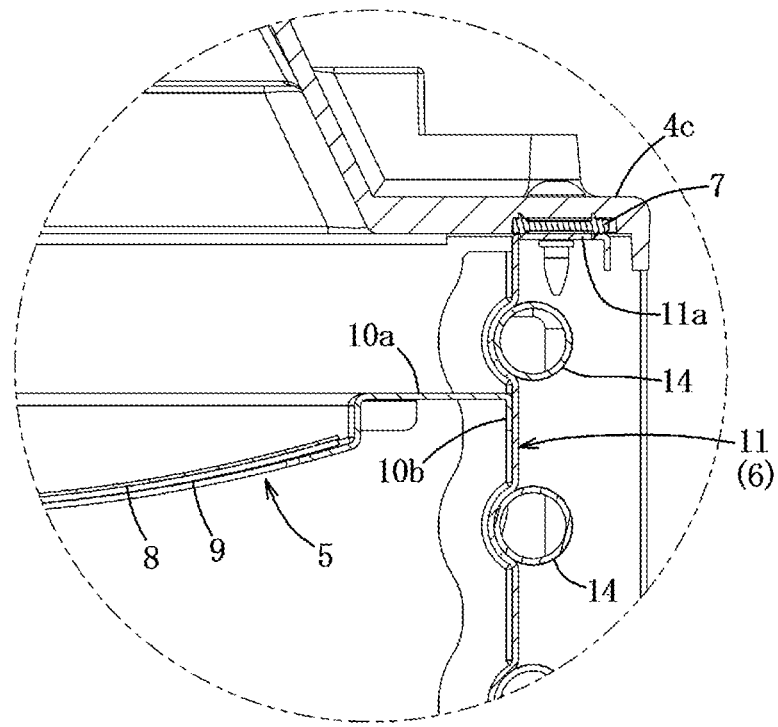
FIG. 9 is an enlarged view of a part b of FIG. 7.

Three heat radiation fins 4b are formed on an upper surface portion of the chamber case 4, but the heat radiation fins 4b may be omitted. A peripheral flange 4c is formed on a peripheral portion of the chamber case 4, a sealing member groove which opens to a lower surface of the peripheral flange 4c is recessed, and an air-fuel mixture sealing member 7 is mounted in the sealing member groove (refer to FIGS. 8 and 9).

As shown in FIGS. 2, 3, 5 and 7, the inverse combustion type burner 5 is formed in a rectangular shape in a plan view with a distributing plate 8 formed of stainless steel having a plurality of small holes formed in the entire surface thereof, and a heat-resistant mat 9 formed of ceramic fibers superimposed on a lower surface of the distributing plate 8, and a support frame 10 from of a steel plate which supports an outer peripheral portion of the distributing plate 8 and the heat-resistant mat 9. The distributing plate 8 and the heat-resistant mat 9 are gently curved in a partially cylindrical shape so that a center portion in a forward and rearward direction is lowest. A shape or a material of the burner 5 is not limited thereto.

The support frame 10 of the burner 5 has a horizontal frame-shaped outer peripheral flange 10a on an outer peripheral portion thereof, and a mounting flange 10b having a small width and formed by bending an outer edge portion vertically downward is formed on the outer peripheral flange 10a. The burner 5 is set inside the case 11 of the heat exchanger 6 at a position lower by a predetermined distance from an upper end of the case 11 and is fixed to the inside of the case 11 by brazing the mounting flange 10b on the outer edge portion to an inner wall surface of the case 11. A combustion space 22 is formed below the burner 5 in the case 11 (refer to FIG. 7).

Figure 2:
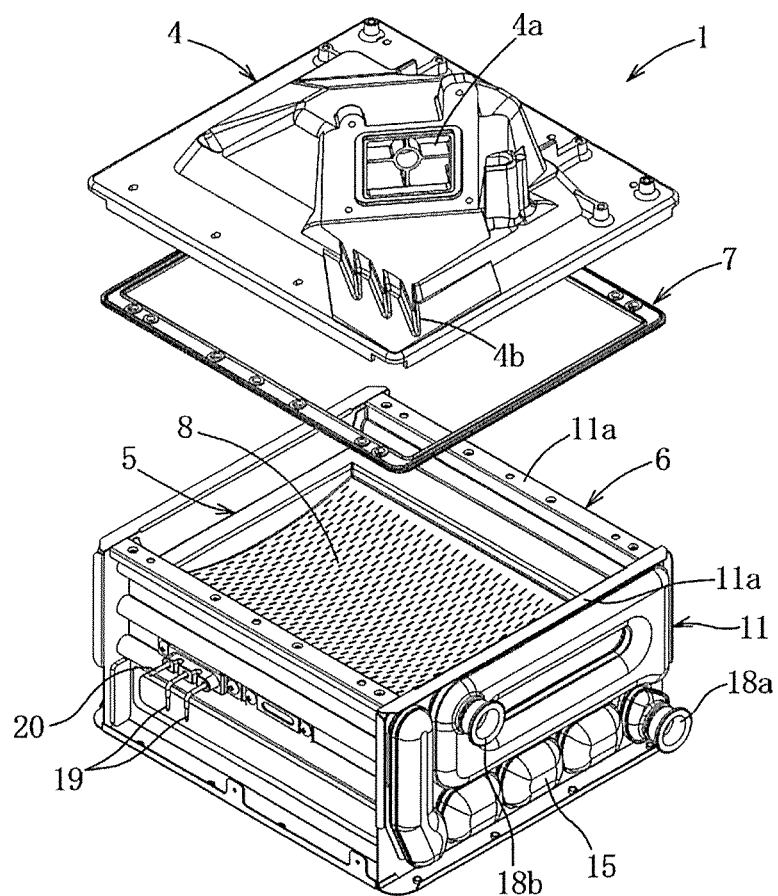
FIG. 2 is an exploded perspective view of the water heating apparatus.
Figure 3:
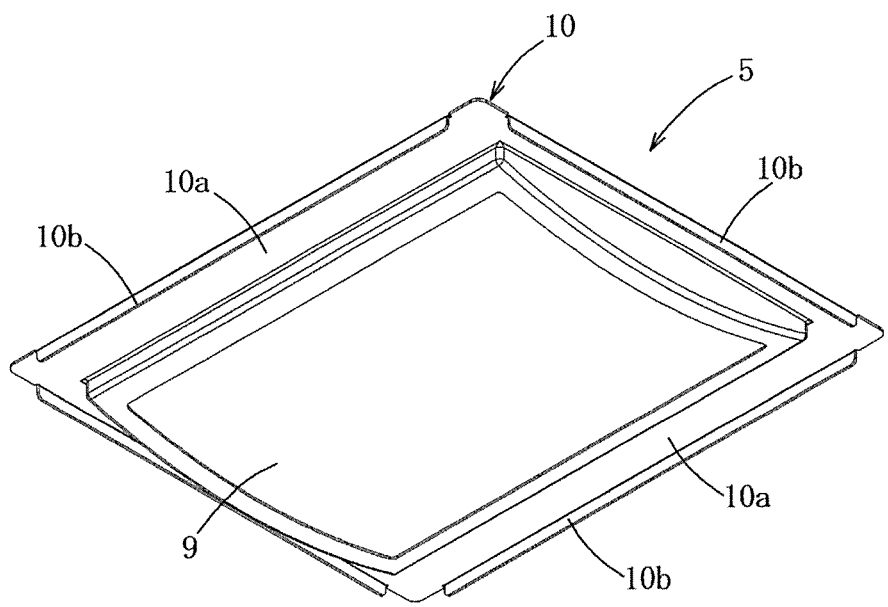
FIG. 3 is a perspective view of a burner.
Figure 4:
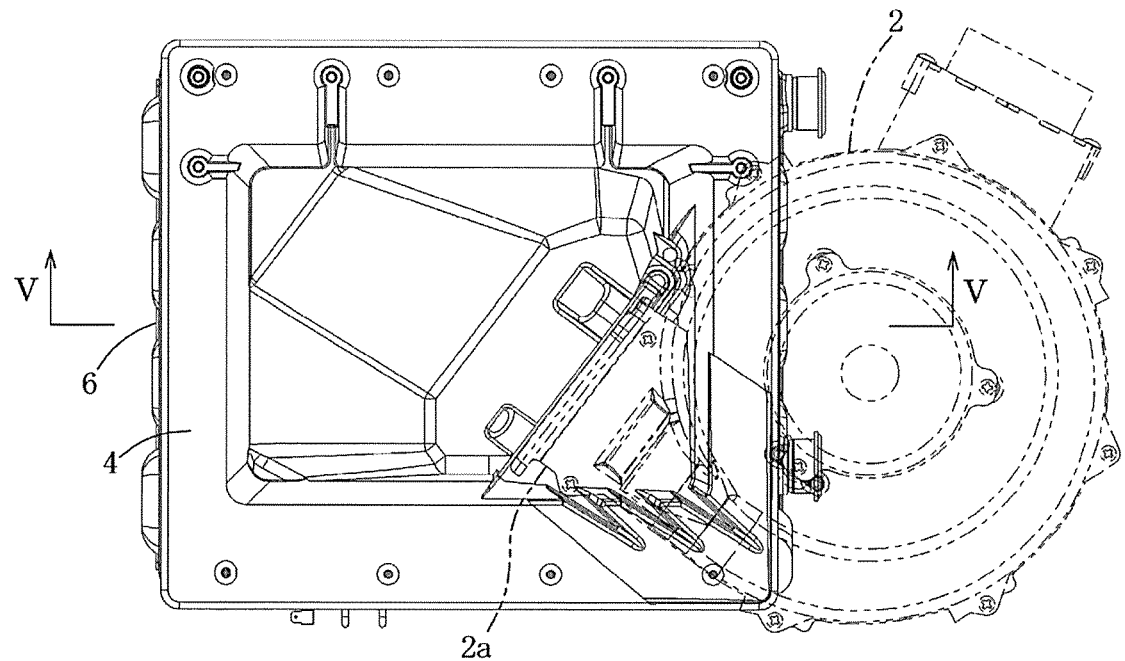
FIG. 4 is a plan view of the water heating apparatus.
Figure 5:
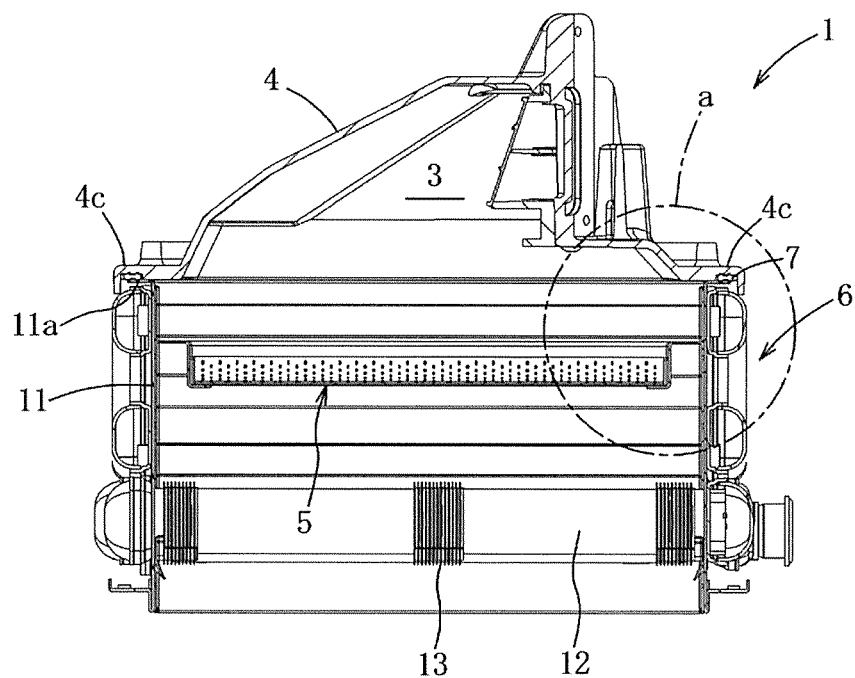
FIG. 5 is a cross-sectional view taken along line V-V of FIG. 4.
Figure 6:
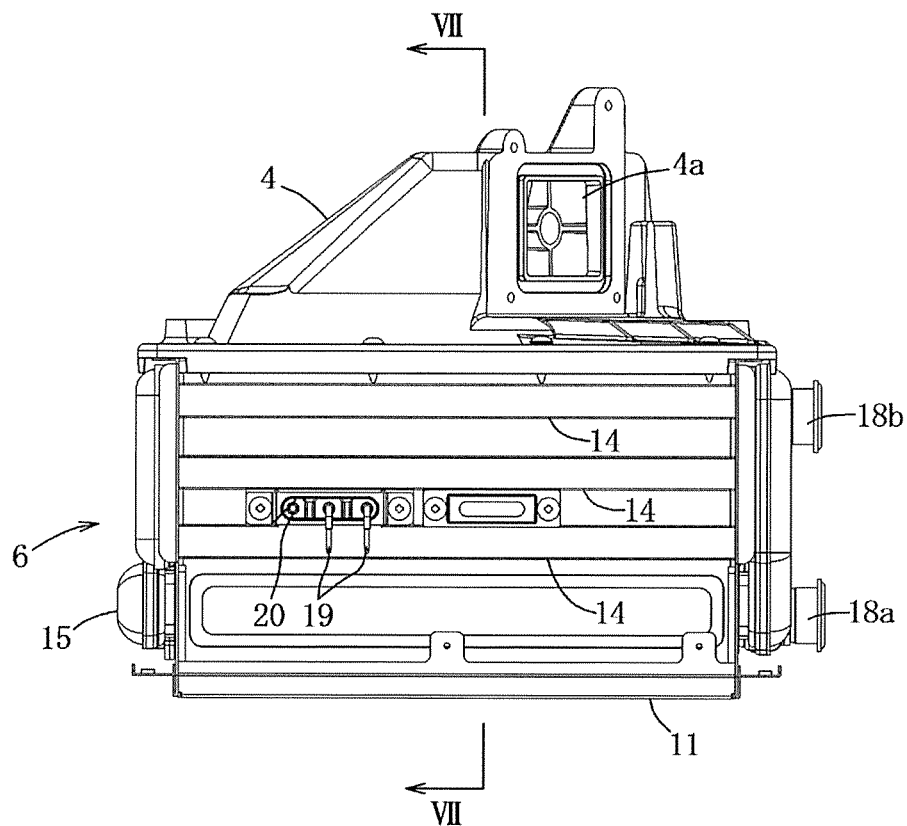
FIG. 6 is a front view of the water heating apparatus.
Figure 7:
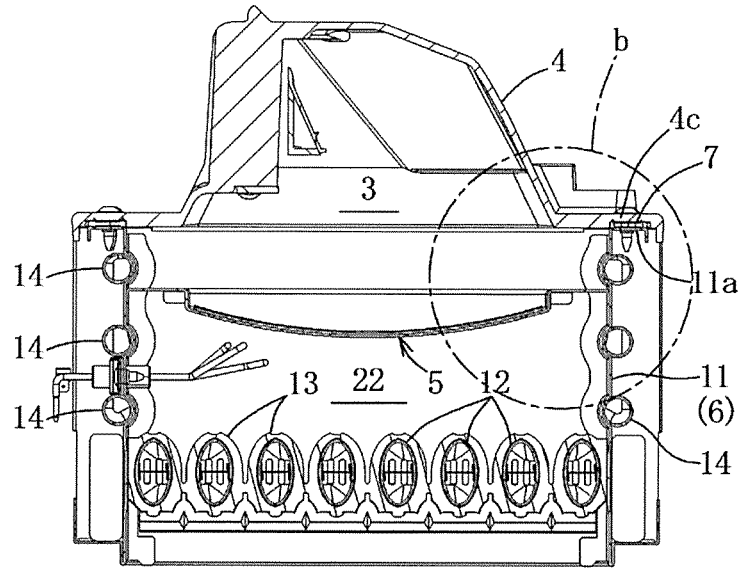
FIG. 7 is a cross-sectional view taken along line VII-VII of FIG. 6.

As shown in FIGS. 2, 5 and 7, the sensible heat recovering heat exchanger 6 includes the rectangular parallelepiped case 11 having a rectangular tube shape and formed of a stainless steel plate, a peripheral flange 11a formed at the upper end of the case 11 and fixed to a peripheral flange 4c of the chamber case 4 by a plurality of screws, eight heat transfer tubes 12 set at a lower portion inside the case 11 in a right and left direction, a plurality of fins 13 through which the heat transfer tubes 12 pass and which is brazed to the heat transfer tubes 12, three cooling pipes 14 provided at an upper portion and an intermediate portion of front and rear plates of the case 11, a plurality of passage forming parts 15 formed on an outer surface of the right plate or an outer surface of the left plate of the case 11, a water inlet 18a and a water outlet 18b, a spark plug 19, a flame rod 20, and the like.

Since the outer peripheral flange 10a of the burner 5 is set at a position corresponding to a position immediately below the uppermost cooling pipe 14, and the uppermost cooling pipe 14 is located at a position closer to the chamber 3 than the outer peripheral flange 10a of the burner 5, and the mounting flange 10b of the burner 5 is joined to the inner wall surface of the case 11 immediately below the uppermost cooling pipe 14, a cooling performance when the outer peripheral flange 10a of the burner 5 is cooled by the case 11 and the cooling pipe 14 can be enhanced.

An operation and effects of the above-described water heating apparatus 1 will be described.

Since the burner 5 is set in the case 11 of the heat exchanger 6 and the outer peripheral flange 10a of the burner 5 is fixed to the inner wall surface of the case 11, the heat transferred to the outer peripheral flange 10a of the burner 5 is transferred from the case 11 of the heat exchanger 6 to the water through the heat transfer tube 12, the cooling pipe 14, or the fins 13 and then can be effectively used for heating the water.

Moreover, since the outer peripheral flange 10a of the burner 5 is not excessively heated, the air-fuel mixture sealing member 7 can be manufactured at low cost with a material having a reduced heat resistance grade. Further, when the amount of heat transferred to the chamber case 4 is reduced, an increase in temperature of the air-fuel mixture is curbed, and as a result, an $NO_X$ level in the exhaust gas can also be reduced.

Moreover, since the burner 5 is brazed to the case 11, it is not necessary to install the exhaust gas sealing member between the outer peripheral flange 10a of the burner 5 and the peripheral flange 11a of the case 11 of the heat exchanger 6, and the exhaust gas sealing member can be omitted.

Furthermore, the number of heat radiation fins 4b formed on an upper surface portion of the chamber case 4 can be greatly reduced or these can be omitted.

Since the mounting flange 10b on an outer edge portion of the outer peripheral flange 10a of the burner 5 is fixed to the inner wall surface of the case 11 by brazing, the outer peripheral flange 10a of the burner 5 can be supported by the inner wall surface of the case 11 with a simple structure.

Since the heat exchanger 6 includes a plurality of heat transfer tubes 12 provided to cross the inside of the case 11, a plurality of heat transfer fins 13 through which the plurality of heat transfer tubes 12 are inserted, and a plurality of cooling pipes 14 which cools the case 11, and at least some of the plurality of cooling pipes 14 are set at positions closer to the chamber 3 than the burner 5, even when the heat transferred from the outer peripheral flange 10a of the burner 5 to the case 11 of the heat exchanger 6 is transferred upward from the case 11, at least some of the cooling pipes 14 are set at positions closer to the chamber 3 than the burner 5, and thus the transferred heat is reliably absorbed by the water in the cooling pipe 14.

In addition, since an upper space of the burner 5 in the case 11 of the heat exchanger 6 can be used as the chamber 3, the chamber case 4 can be flattened, and a degree of freedom of installation such as the fan 2 being set vertically is increased.

Next, an example in which the embodiment is partially changed will be described.

Figure 10:
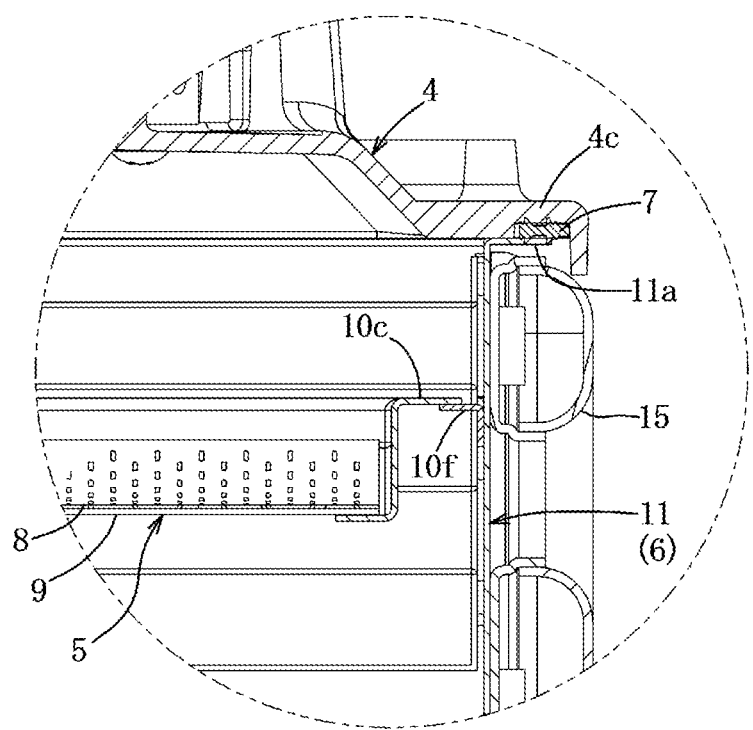
FIG. 10 is a view corresponding to FIG. 8 according to a modified example.
Figure 11:
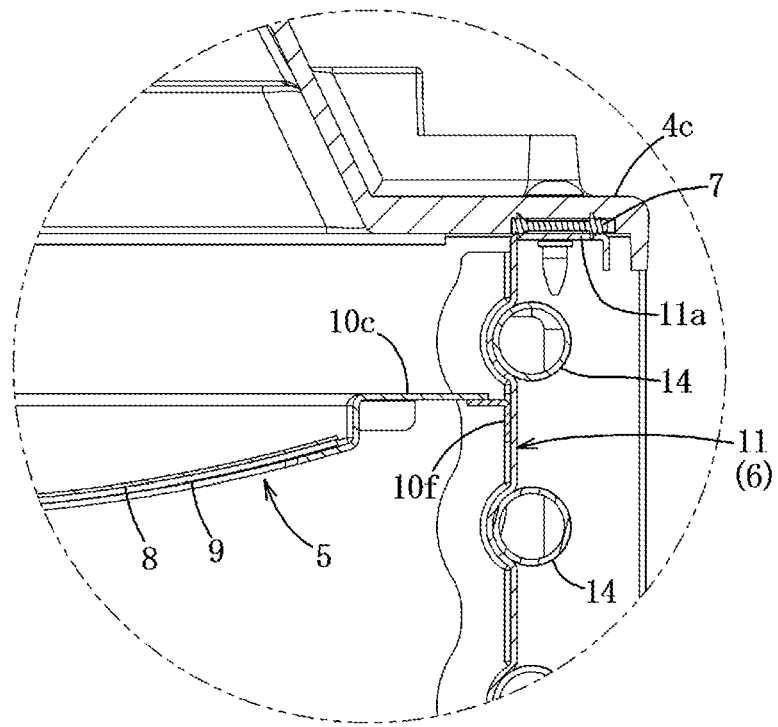
FIG. 11 is a view corresponding to FIG. 9 according to the modified example.
Figure 12:
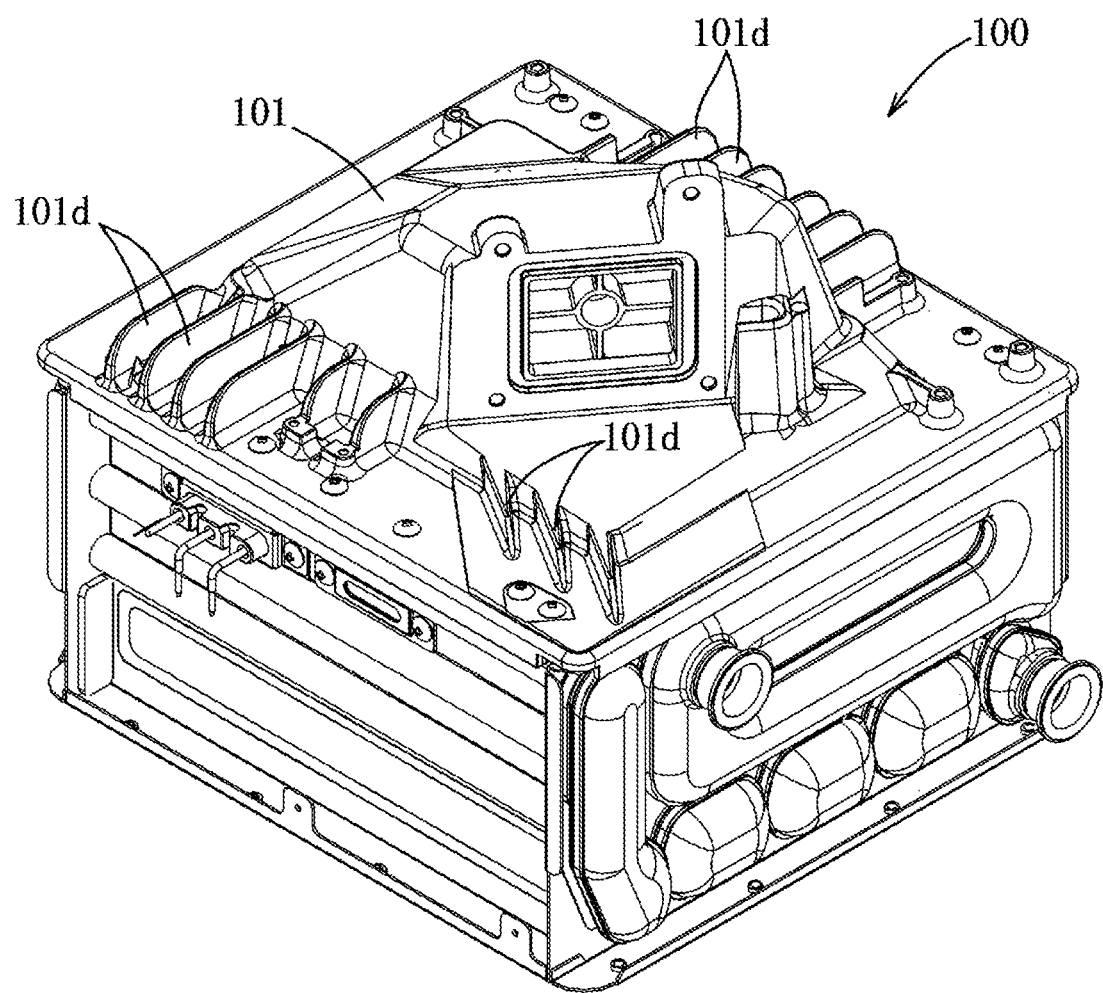
FIG. 12 is a perspective view of a conventional water heating apparatus.
Figure 13:
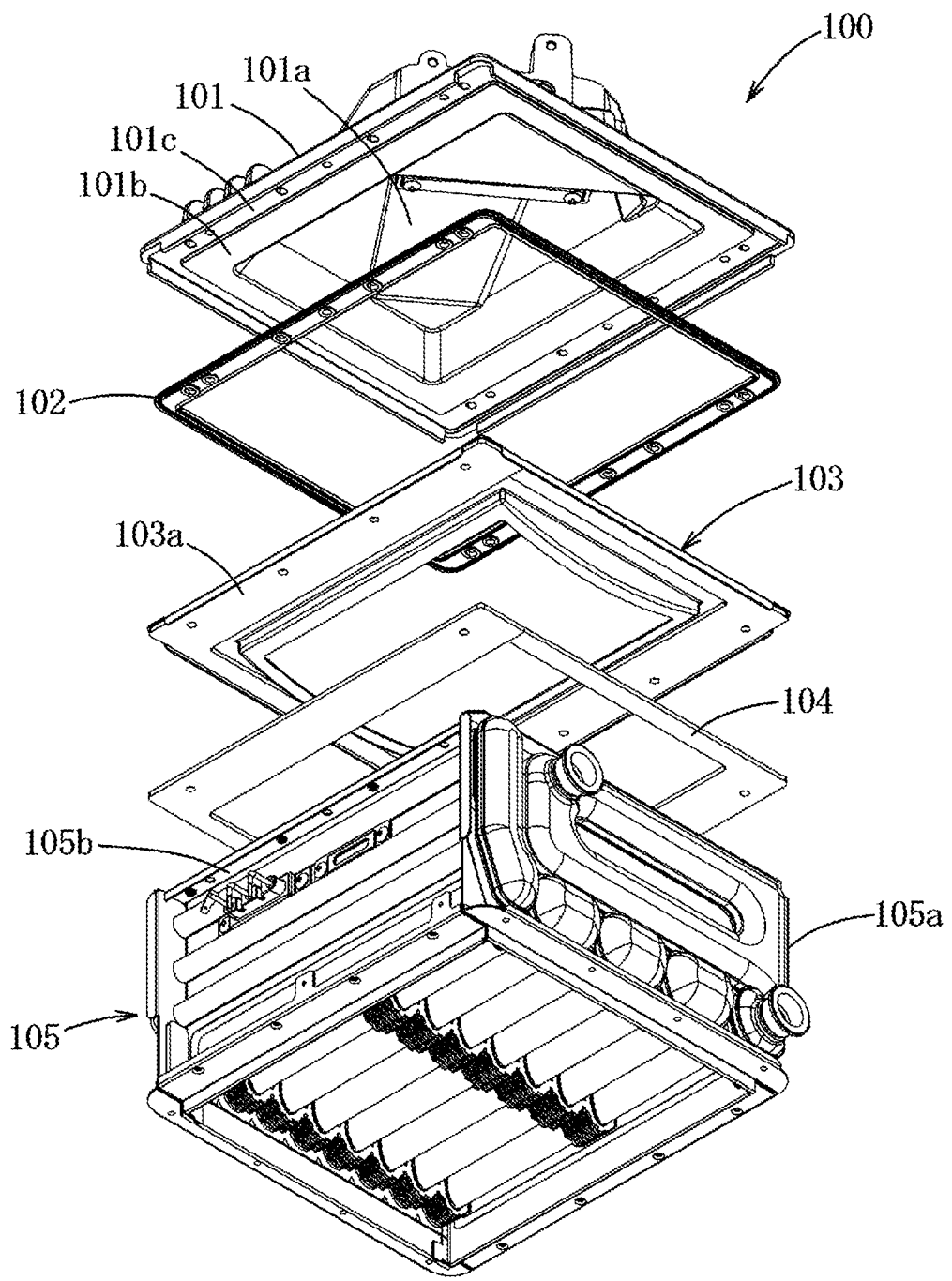
FIG. 13 is an exploded perspective view of the conventional water heating apparatus.

As shown in FIG. 10 and FIG. 11, the mounting flange 10b of the outer peripheral flange 10a of the burner 5 is omitted, a holding flange 10f having an angled cross section as if the mounting flange 10b were separated from the outer peripheral flange 10a is fixed to the inner wall surface of the case 11 of the heat exchanger 5 by brazing, and the outer peripheral flange 10c of the burner 5 is fixed to an upper end surface of the holding flange 10f by brazing.

With such a configuration, an operation in which the holding flange 10f is brazed to the inner wall surface of the case 11 is simplified, and an operation in which the outer peripheral flange 10c is brazed to the upper end surface of the holding flange 10f is simplified. However, a tip end of the outer peripheral flange 10c of the burner 5 may be brazed directly to the inner wall surface of the case 11.

The fixing structure of the outer peripheral flanges 10a and 10c of the burner 5 to the inner wall surface of the case 11 is preferably brazed but is not an essential structure. For example, a structure in which the mounting flange 10b is fitted and fixed to the inner wall surface of the case 11 may be employed. Further, a structure in which the outer peripheral flange 10c is fixed to the holding flange 10f using a fastening member may be employed.

There may be a case in which a latent heat recovery heat exchanger is provided in the water heating apparatus of the embodiment. In addition, those skilled in the art can implement the embodiment with various modifications added without departing from the spirit of the disclosure, and the disclosure includes such various modifications.

What is claimed is:

1. A water heating apparatus comprising:
a fan which supplies combustion air;
a chamber case which is connected to the fan and in which an air-fuel mixture is formed in a chamber inside the chamber case;
an inverse combustion type burner which burns the air-fuel mixture supplied from the chamber;
a heat exchanger which has a case and into which combustion gas generated in the burner is supplied to heat water; and
a sealing member which is mounted between a first peripheral flange of the chamber case and a second peripheral flange of the case,
wherein the burner is set inside the case of the heat exchanger, and an outer peripheral flange provided on the burner is fixed to an inner wall surface of the case of the heat exchanger, and
the heat exchanger includes a plurality of cooling pipes for cooling the case of the heat exchanger which are provided on an outer surface of the case of the heat exchanger,
wherein the heat exchanger includes a plurality of heat transfer tubes provided to cross an inside of the case, a plurality of heat transfer fins through which the plurality of heat transfer tubes are inserted, and at least some of the plurality of cooling pipes are set at positions closer to the chamber than the burner.

2. The water heating apparatus according to claim 1, wherein a holding flange capable of holding the outer peripheral flange of the burner from an side below is provided on the inner wall surface of the case of the heat exchanger, and the outer peripheral flange of the burner is fixed to the inner wall surface of the case or the holding flange by brazing.

* * * * *